(12) United States Patent
Kamiyama et al.

(10) Patent No.: US 8,286,679 B2
(45) Date of Patent: Oct. 16, 2012

(54) VEHICLE WHEEL

(75) Inventors: Youichi Kamiyama, Saitama (JP);
Katsushi Ishii, Saitama (JP); Hisamitsu Takagi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 80 days.

(21) Appl. No.: 12/587,746

(22) Filed: Oct. 13, 2009

(65) Prior Publication Data
US 2010/0090520 A1 Apr. 15, 2010

(30) Foreign Application Priority Data
Oct. 15, 2008 (JP) ................................ 2008-266057

(51) Int. Cl.
*B60B 21/02* (2006.01)
*B60C 19/00* (2006.01)
(52) U.S. Cl. .................................... 152/381.6; 301/6.91
(58) Field of Classification Search ............... 152/381.5, 152/381.6, 400, 516, 518, 519, 520; 301/6.91
See application file for complete search history.

(56) References Cited

U.S. PATENT DOCUMENTS

| 7,690,410 B2 * | 4/2010 | Kamiyama et al. ......... 152/381.5 |
| 7,896,043 B2 * | 3/2011 | Kashiwai et al. ........... 152/381.6 |
| 7,896,044 B2 * | 3/2011 | Kashiwai et al. ........... 152/381.6 |
| 2008/0179939 A1* | 7/2008 | Kusaka et al. ............ 301/95.104 |

FOREIGN PATENT DOCUMENTS

| JP | 2004-090669 |   | 3/2004 |
| JP | 2004299484 A | * | 10/2004 |
| JP | 2006256535 A | * | 9/2006 |
| JP | 2006273182 A | * | 10/2006 |
| JP | 2006298231 A | * | 11/2006 |
| JP | 3992566 |   | 8/2007 |

OTHER PUBLICATIONS

Machine Translation of JP 2004299484A.*

* cited by examiner

*Primary Examiner* — Kip T Kotter
(74) *Attorney, Agent, or Firm* — Carrier Blackman & Associates, P.C.; Joseph P. Carrier; William D. Blackman

(57) ABSTRACT

A vehicle wheel which includes an additional air chamber member forming an additional air chamber in a tire air chamber. The additional air chamber member is fixed on an outer circumferential surface of a well portion of a rim. The additional air chamber member is provided with a communication hole communicating between the additional air chamber and the tire air chamber. The communication hole is disposed at a position shifted from a discharge port of an air valve for supplying air in the tire air chamber in a wheel circumferential direction and opened to the tire air chamber.

2 Claims, 7 Drawing Sheets

VEHICLE WHEEL

CROSS REFERENCE TO RELATED APPLICATIONS

This application claims the foreign priority benefit under Title 35, United States Code, §119(a)-(d) of Japanese Patent Application No. 2008-266057, filed on Oct. 15, 2008, the contents of which are hereby incorporated by reference.

BACKGROUND OF THE INVENTION

1. Field of the Invention

The present invention relates to a vehicle wheel which reduces a noise emission accompanying an air column resonance (cavernous resonance) inside a tire air chamber.

2. Description of Related Art

In general, it is known that an air column resonance generated in an air chamber of a tire (hereinafter, referred to as tire air chamber) causes a road noise of a vehicle. The air column resonance is a phenomenon which generates a resonant sound in such a manner that random vibrations transmitted from a road surface to the tire vibrate air in the tire air chamber, and consequently a resonant phenomenon is generated at around an air column resonance frequency of the tire air chamber.

Conventionally, a vehicle wheel described in Japanese Patent No. 3992566 has been known as a vehicle wheel which reduces a noise emission accompanying the air column resonance. The vehicle wheel includes a plurality of additional air chambers along a circumferential direction of a rim. In more detail, in the vehicle wheel, a circular space portion formed between a circular vertical wall, which is vertically disposed in a well portion and extending in the circumferential direction of the rim, and a rising side wall of the well portion toward a bead seat portion is covered with a cap member. The circular space portion zoned by the cap member, the well portion and the vertical wall is partitioned by a plurality of separators disposed at a predetermined interval in the wheel circumferential direction to form each additional air chamber. In addition, the tire air chamber and each additional air chamber are communicated with each other through a communication hole formed in the cap member. In the vehicle wheel described above, the communication hole and the additional air chamber constitute a Helmholtz resonator and the air column resonance sound inside the tire air chamber can be reduced by the resonator.

However, a structure of the conventional vehicle wheel was not a practical structure. That is, it was required to accurately joint a plurality of separators and the cap member to the vehicle wheel having a vertical wall rising from the well portion by welding, bonding, fitting or fastening, while keeping airtightness. Accordingly, the vehicle wheel was not suitable for a mass production in view of securing the airtightness, and an increase in the manufacturing workload or the manufacturing cost.

Hence, in view of solving the above-identified problems, inventors of the present invention proposed a vehicle wheel which can be manufactured by only fitting an additional air chamber member having an additional air chamber in a space between a first vertical wall surface and a second vertical wall surface formed in a well portion (JP 2007-125139, filed on May 10, 2007, not laid-open yet).

In the vehicle wheel, the additional air chamber member has the edge portions extending to the first vertical wall surface and the second vertical wall surface and the edge portions are locked to locking portions formed on the first vertical wall surface and the second vertical wall surface, respectively. The additional air chamber member can be fitted in a space between the first vertical wall surface and the second vertical wall surface only by locking the edge portions to the respective locking portions of the first vertical wall surface and the second vertical wall surface, by utilizing elasticity of the edge portions.

According to the vehicle wheel, a mass productivity of the vehicle wheel can be improved, as the manufacturing workload and manufacturing cost can be reduced in comparison with a conventional vehicle wheel.

Meanwhile, in the vehicle wheel, a communication hole disposed in the additional air chamber member was formed to be opened in the wheel width direction. In addition, a discharge port of an air valve for supplying air to a tire air chamber was also formed directed to the wheel width direction. Therefore, when a tire pressure is adjusted, if a water is accumulated, for example, in an air compressor, or tire repairing agent is used, there is a possibility that the water or the agent may enter the additional air chamber through the communication hole, and thereby, a volume of the additional air chamber may be changed due to the entering of, for example, the water. Hence, it is required that these substances such as water are prevented from entering the additional air chamber.

It is, therefore, an object of the present invention to solve the foregoing problems and hence to provide a vehicle wheel which can prevent, for example, water from entering an additional air chamber and can preferably reduce an air column resonance sound.

SUMMARY OF THE INVENTION

According to a first aspect of the present invention which solves the foregoing problems, there is provided a vehicle wheel which includes an additional air chamber member forming an additional air chamber in a tire air chamber. The additional air chamber member is fixed on an outer circumferential surface of a well portion of a rim and provided with a communication hole communicating between the additional air chamber and the tire air chamber. The communication hole is disposed at a position shifted from a discharge port of an air valve for supplying air in the tire air chamber in a wheel circumferential direction and opened to the tire air chamber.

In the vehicle wheel, since the communication hole is opened to the tire air chamber at the position shifted from the discharge port of the air valve for supplying air to the tire air chamber in the wheel circumferential direction, even if water and tire repairing agent are discharged from the air valve when a tire pressure is adjusted, the water and the tire repairing agent are prevented from entering the additional air chamber of the additional air chamber member through the communication hole.

As a result, a change of volume of the additional air chamber due to, for example, water is not caused and a reduction of the air column resonance sound by the additional air chamber member can be effectively maintained.

In addition, a static wheel balance can be prevented from deteriorating due to entering and accumulating of, for example, water in the additional air chamber.

The vehicle wheel is further characterized in that the air valve is disposed on one side in the wheel width direction and the communication hole is opened toward the one side.

According to the vehicle wheel of the present invention, a vehicle wheel that can prevent, for example, water from entering the additional air chamber and can effectively reduce the air column resonance sound can be obtained.

In addition, a static wheel balance can be prevented from deteriorating due to entering and accumulating of, for example, water in the additional air chamber.

DETAILED DESCRIPTION OF THE PREFERRED EMBODIMENT

Hereinafter, an embodiment of the present invention will be described in detail by referring to drawings.

A vehicle wheel according to the embodiment is characterized mainly in that a communication hole of an additional air chamber member is disposed at a position shifted from a discharge port of an air valve in a circumferential direction of a well portion. Here, first, a whole structure of the vehicle wheel will be described, and after that, a structure of the additional air chamber member will be described.

<<Whole Structure of Vehicle Wheel>>

Figure 1:
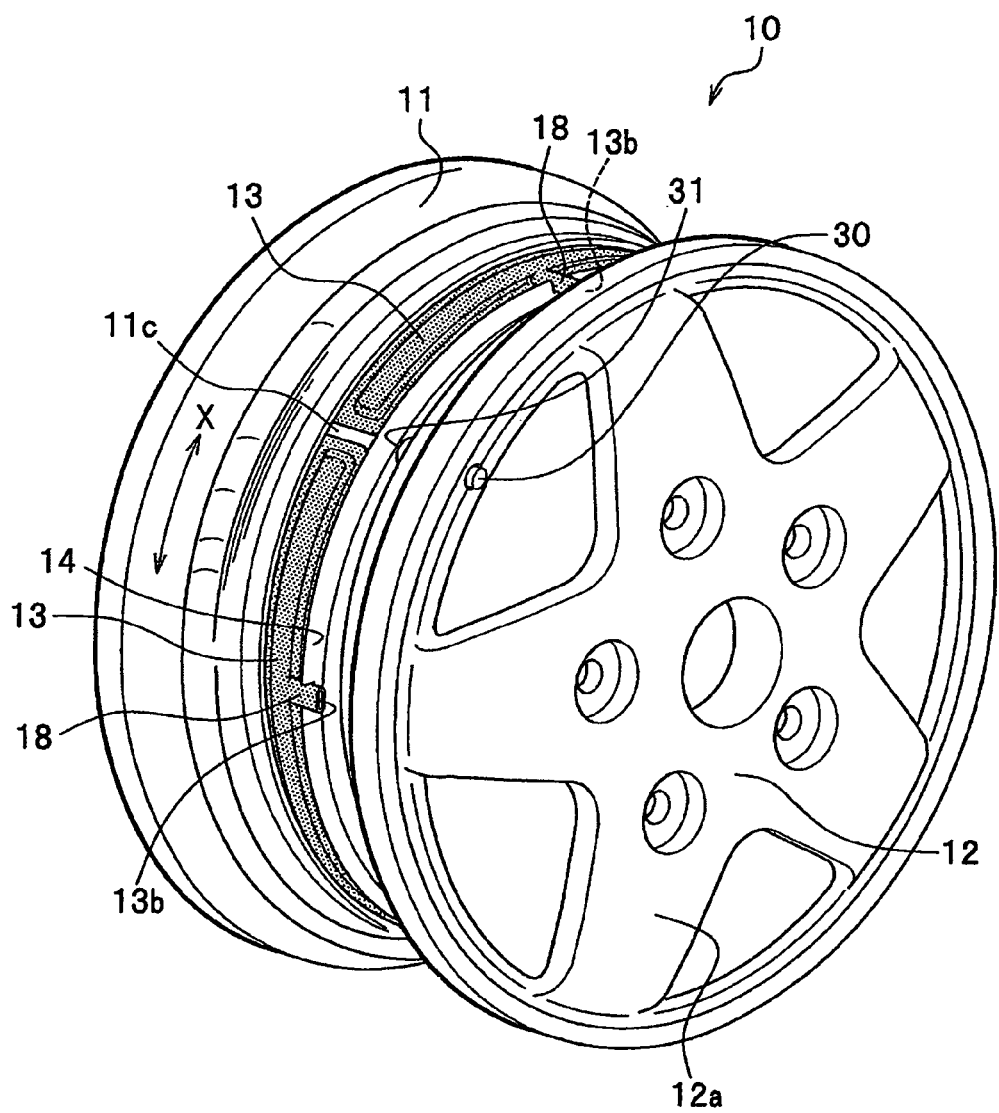
FIG. 1 is a perspective view of a vehicle wheel according to an embodiment of the present invention.
Figure 2:
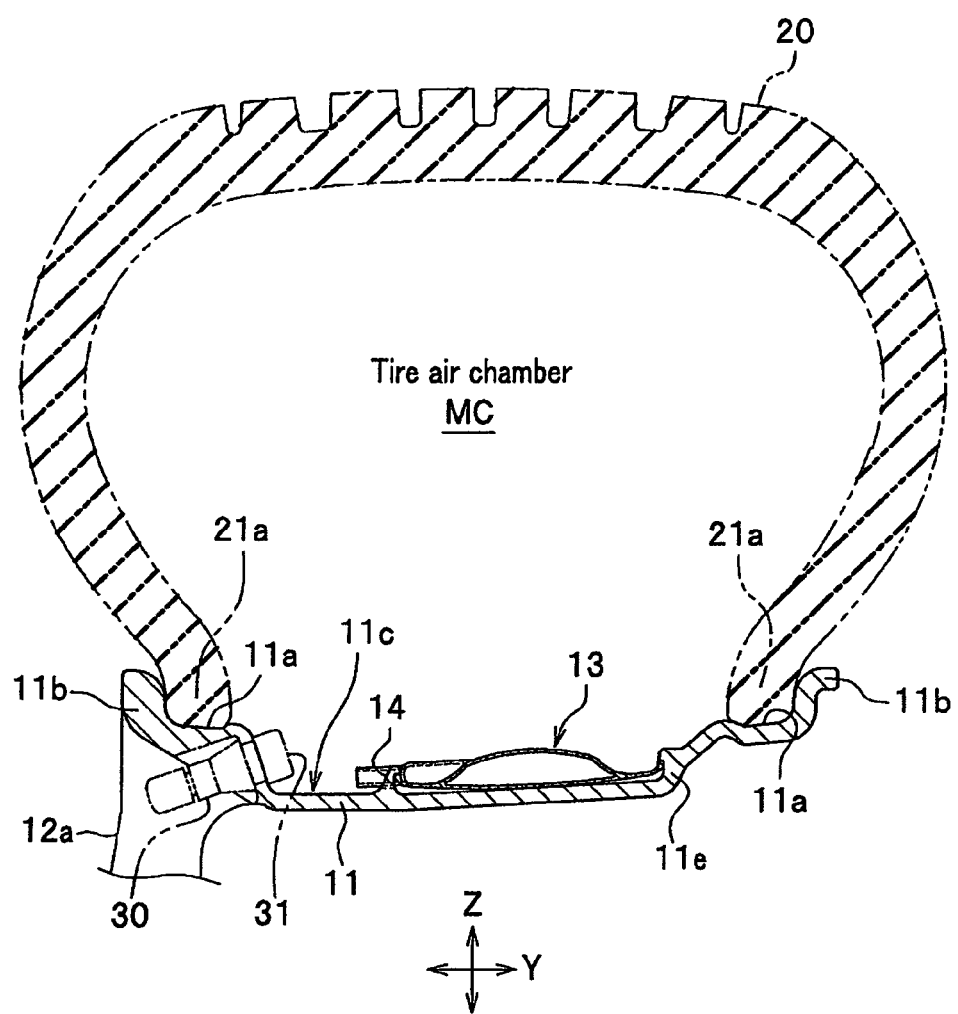
FIG. 2 is a main part front cross sectional view of a wheel mounting a tire on the vehicle wheel of FIG. 1.
Figure 3:
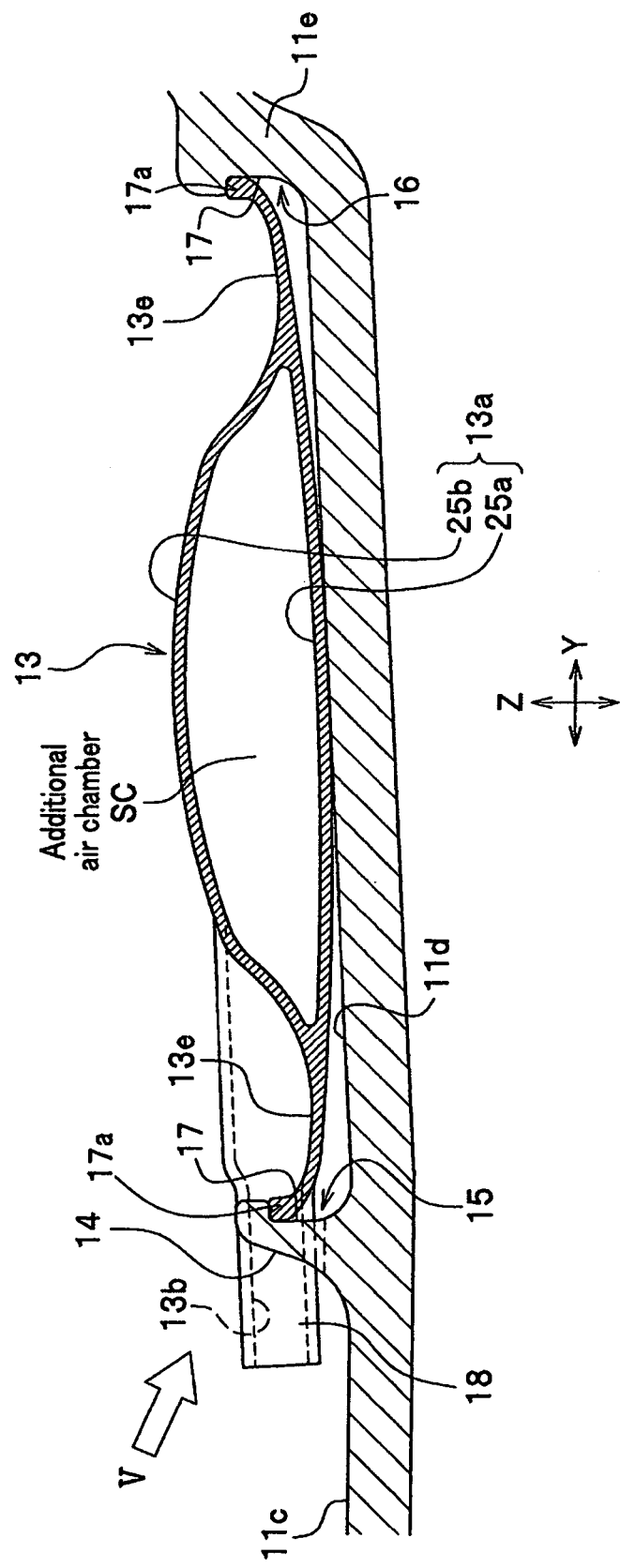
FIG. 3 is a partially enlarged view of a well portion shown in FIG. 2.

In the drawings, FIG. 1 is a perspective view of a vehicle wheel according to an embodiment of the present invention. FIG. 2 is a main part front cross sectional view of a wheel mounting a tire on the vehicle wheel of FIG. 1. FIG. 3 is a partially enlarged view of a well portion shown in FIG. 2.

As shown in FIG. 1, a vehicle wheel 10 according to the embodiment mainly consists of a rim 11, a disk 12 for connecting the rim 11 to a hub not shown and an additional air chamber member 13 which is fixed on an outer circumferential surface of a well portion 11c of the rim 11.

In the embodiment, the rim 11 and the disk 12 are integrally manufactured via a spoke 12a, using, for example, a lightweight and high-strength material such as aluminum alloy and magnesium alloy. It is noted that the material is not limited to these and may be, for example, steel, and the rim 11, the disk 12 and the spoke 12a may be consist of two pieces or three pieces.

As shown in FIG. 2, the rim 11 includes bead seat portions 11a, 11a formed in both end portions of the rim 11 in the wheel width direction Y, rim flange portions 11b, 11b curved in a L-shape toward outside (upper side in FIG. 2) in the wheel radial direction Z from the bead seat portions 11a, 11a and a well portion 11c which is sunk toward inside (lower side in FIG. 2) in the wheel radial direction Z and located between the bead seat portions 11a, 11a.

A bead portion 21a of a tire 20 is mounted on the bead seat portion 11a. This forms a tire air chamber MC which is a circular sealed space formed between an outer circumferential surface of the rim 11 and an inner circumferential surface of the tire 20.

The well portion 11c is formed for temporarily sinking the bead portions 21a, 21a of the tire 20 in the well portion 11c when the tire 20 is mounted on the rim 11.

A circular vertical wall 14 extending in the circumferential direction of the rim 11 is vertically disposed on the outer circumferential surface of the well portion 11c.

As shown in FIG. 3, the vertical wall 14 is vertically disposed on the outer circumferential surface 1id of the well portion 11c so that the vertical wall 14 forms a first vertical wall surface 15 rising outward (upper side in FIG. 3) in the wheel radial direction Z from the outer circumferential surface 11d of the well portion 11c.

In addition, in a side portion 11e formed on the inner side (right side in FIG. 3) of the well portion 11c in the wheel width direction Y, a second vertical wall surface 16 is formed so as to face the first vertical wall surface 15. It is noted that the vertical wall 14 according to the embodiment is integrally formed with the well portion 11c when the rim 11 is cast.

Furthermore, a groove portion 17 is formed on the first vertical wall surface 15 and the second vertical surface 16, respectively. These groove portions 17, 17 are disposed along the circumferential direction of the outer circumferential surface 11d of the well portion 11c to form circular grooves. The edge portions 13e, 13e of the additional air chamber member 13, which will be described later, are fitted in the groove portions 17, 17, respectively. In more detail, the front end portions of the edge portions 13e, 13e are respectively locked to locking surfaces 17a, 17a which are formed in each of the grooves 17, 17 so as to face the outer circumferential surface 1id of the well portion 11c. Meanwhile, the groove portions 17, 17 according to the embodiment are formed by machining the vertical wall 14 and the side portion 11e, respectively.

<<Structure of Additional Air Chamber Member>>

Figure 4:
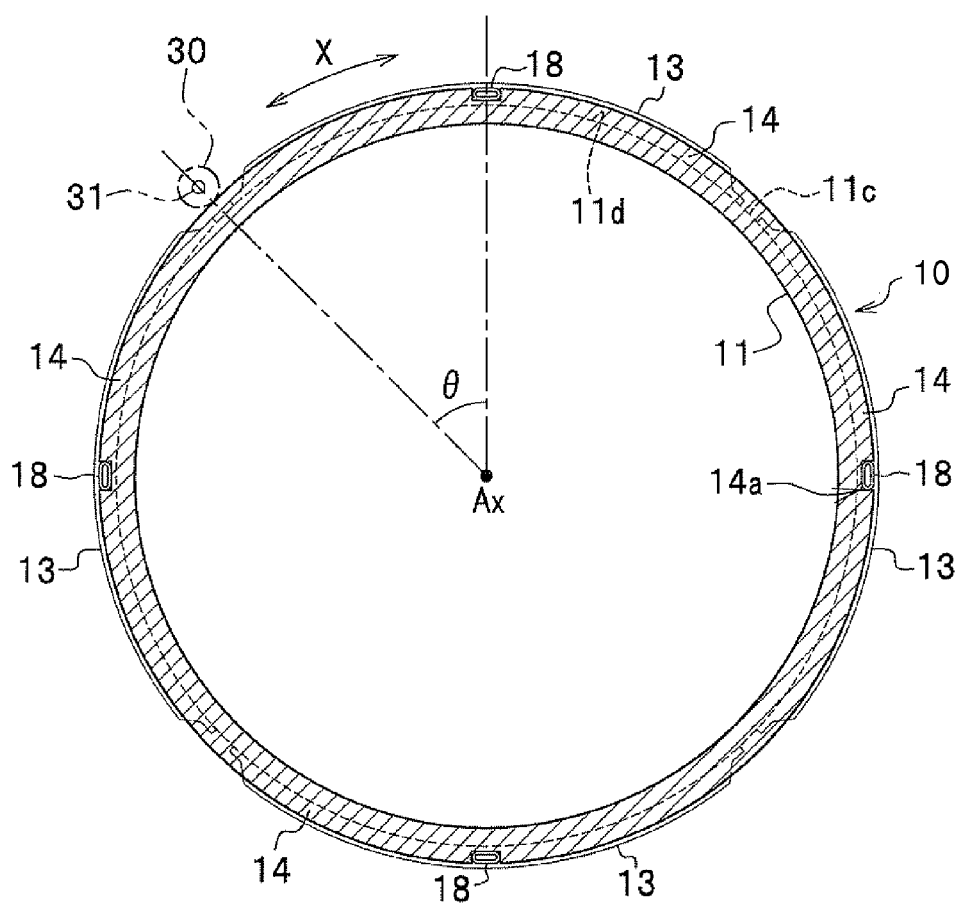
FIG. 4 is a side cross sectional view of a vehicle wheel showing an arrangement position of an additional air chamber member.
Figure 5:
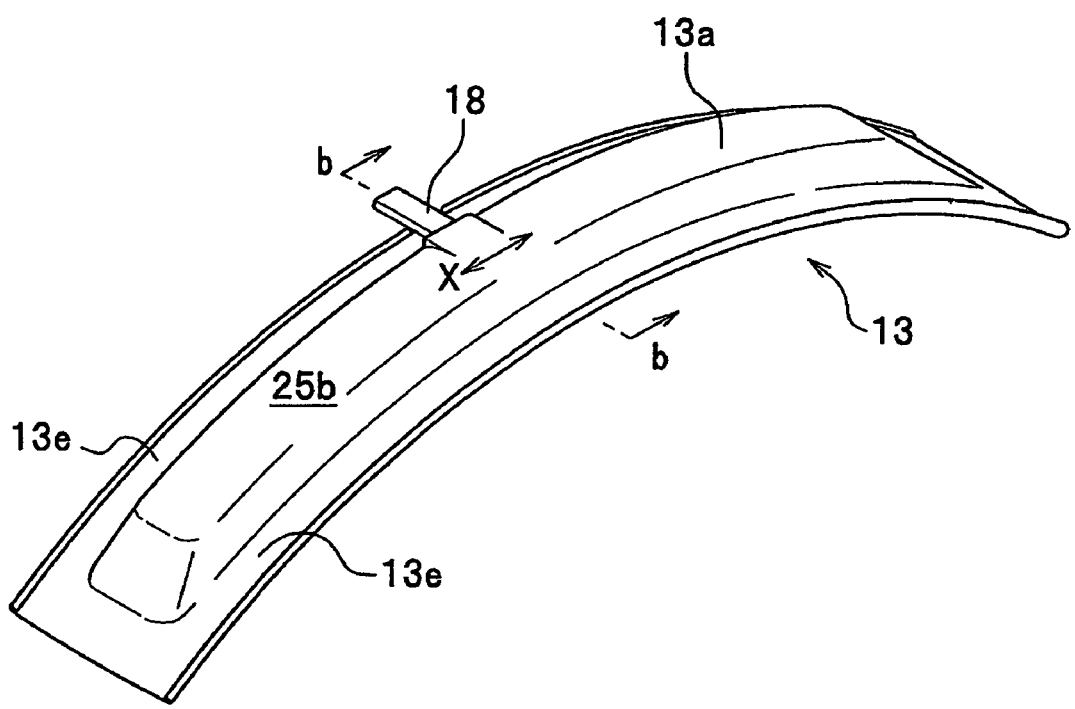
FIG. 5 is an overall perspective view of an additional air chamber member as seen from an upper plate side.
Figure 6A:
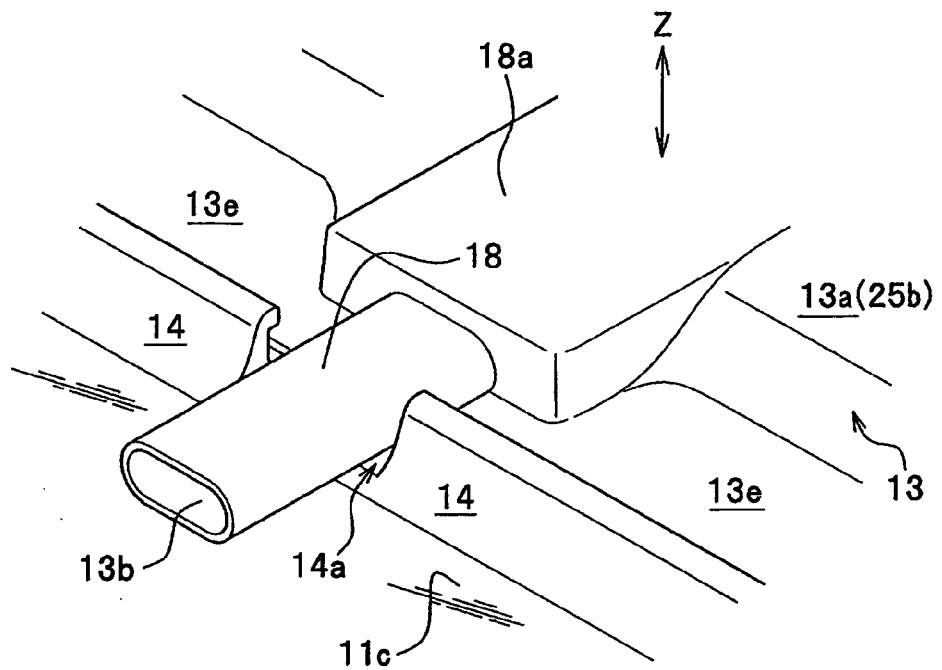
FIG. 6A is a perspective view of a rotation stopper portion of the additional air chamber member as seen from a V-direction in FIG. 3.
Figure 6B:
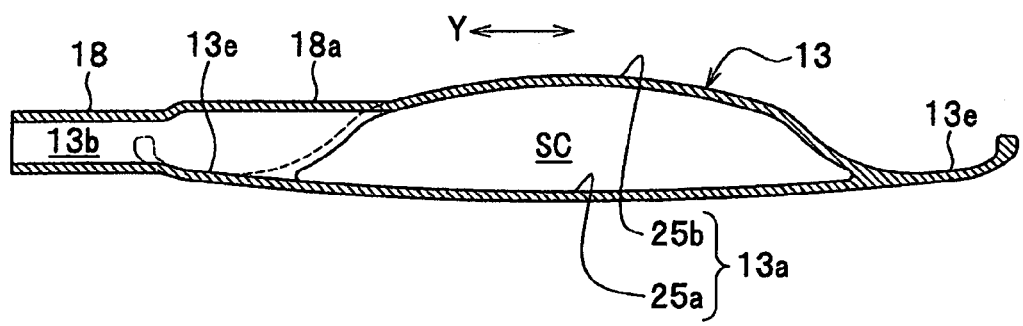
FIG. 6B is a cross sectional view of the additional air chamber member taken along b-b line of FIG. 5.

Next, the additional air chamber member 13 will be described. FIG. 4 is a side cross sectional view of a vehicle wheel showing an arrangement position of an additional air chamber member. FIG. 5 is an overall perspective view of an additional air chamber member as seen from an upper plate side. FIG. 6A is a perspective view of a rotation stopper portion of the additional air chamber member as seen from a V-direction in FIG. 3 and FIG. 6B is a cross sectional view of the additional air chamber member taken along b-b line of FIG. 5.

As shown in FIG. 4, in the vehicle wheel 10 according to the embodiment, four additional air chamber members 13 are arranged along the wheel circumferential direction X of the well portion 11c at a regular interval (at each 90 degrees). Namely, two sets of a pair of additional air chamber members 13, 13 facing across a wheel center axis Ax are arranged.

As shown in FIG. 5, the additional air chamber member 13 is a long member in the wheel circumferential direction X and includes a main body 13a, a rotation stopper portion 18 and the edge portion 13e. The additional air chamber member 13 is curved along the longitudinal direction thereof, and as shown in FIG. 4, arranged along the outer circumferential surface 11d of the well portion 11c.

(Main Body)

As shown in FIG. 3, the main body 13a includes a bottom plate 25a and an upper plate 25b which is arranged above the bottom plate 25a. In the embodiment, thicknesses of the bottom plate 25a and the upper plate 25b are the same. However, the thicknesses may be different each other.

The bottom plate 25a, as will be described later, forms a curved surface which is in contact with the outer circumferential surface 11d by expanding toward the outer circumferential surface 11d of the well portion 11c together with the edge portions 13e, 13e extending to the first vertical wall surface 15 and the second vertical wall surface 16, respectively.

The upper plate 25b forms a swelling above the bottom plate 25a that is arranged along the outer circumferential surface 11d of the well portion 11c by curving so as to swell toward the upper side in the wheel radial direction Z.

The main body 13a forms an additional air chamber SC, which will be described next, between the bottom plate 25a and the upper plate 25b.

Here, a volume of the additional air chamber SC is preferably 50 to 250 cc. If the volume of the additional air chamber SC is set in the range described above, the additional air chamber member 13 can achieve weight saving of the vehicle wheel 10 by suppressing an increase in the weight of the additional air chamber member 13, while performing a sufficient silencing effect. In addition, a length of the additional air chamber member 13 in the wheel circumferential direction can be set as appropriate in consideration of a weight adjustment of the vehicle wheel 10 and easiness in fixing the additional air chamber member 13 to the well portion 11c, as long as the length is within a circumferential length of the rim 11, which is a maximum length of the additional air chamber member 13.

(Rotation Stopper Portion)

The rotation stopper portion 18 described above is a portion for surely stopping a rotation of the additional air chamber member 13 when the vehicle wheel 10 shown in FIG. 1 rotates.

As shown in FIG. 5, the rotation stopper portion 18 protrudes from the main body 13a in a direction intersecting with the wheel circumferential direction X (rotation direction of vehicle wheel 10, see FIG. 1).

In more detail, as shown in FIG. 6A, the rotation stopper portion 18 extends to the vertical wall 14 from a base portion 18a which is formed by partially flattening the upper plate 25b of the main body 13a.

In addition, a front end portion of the rotation stopper portion 18 is fit in a recess 14a formed in the vertical wall 14. Meanwhile, the recess 14a according to the embodiment is formed simultaneously with the vertical wall 14 when the rim 11 (see FIG. 1) is cast, or by machining the vertical wall 14.

The rotation stopper portion 18 according to the embodiment is formed by a tube member, and as shown in FIG. 6B, a communication hole 13b connecting the additional air chamber SC and the tire air chamber MC (see FIG. 2) is formed inside the tube member.

A cross sectional shape of the communication hole 13b is not limited specifically. In the embodiment, the shape is an ellipsoid (see FIG. 6A). However, the shape may be a circle, polygon and etc. . . . If the cross sectional shape is a circle, a diameter of the communication hole 13b is preferably not less than 5 mm. If the cross sectional shape is not a circle, it is preferable that a cross sectional area of the communication hole 13b is not less than that of a circle having a diameter of 5 mm.

A length of the communication hole 13b is set to meet a formula for calculating a resonant frequency of the Helmholtz resonator shown in the next formula 1.

$$f0 = C/2\pi \times \sqrt{(S/V(L+\alpha \times \sqrt{S}))} \quad \text{(formula 1)}$$

f0 (H z): Resonant frequency
C (m/s): Sonic speed in additional air chamber SC (=sonic speed in tire air chamber MC)
V (m$^3$): Volume of additional air chamber SC
L (m): Length of communication hole 13b
S (m$^2$): Cross sectional area of opening of communication hole 13b
α: Correction factor It is noted that the resonant frequency f0 is set to meet a resonant frequency of the tire air chamber MC. In this case, the resonant frequencies f0 of the four additional air chamber members 13 shown in FIG. 4 may be set to be the same, or may be set to be different from each other. Specifically, if two resonant frequencies (f1, f2) are observed in the tire air chamber MC (see FIG. 2), the resonant frequencies f0 of the four additional air chamber members 13 may be set to (f1+f2)/2. In addition, the resonant frequencies f0 of one pair of the additional air chamber members 13, 13 facing each other across the center of the rim may be set to f1, and those of the other pair of the additional air chamber members 13, 13 facing each other across the center of the rim may be set to f2. Furthermore, all resonant frequencies f0 of the four additional air chamber members 13 may be set to f1 or f2.

In the embodiment, as shown in FIG. 1, the communication hole 13b is disposed and opened at a position shifted from the discharge port 31 of the air valve 30 for supplying air in the tire air chamber MC (see FIG. 2) in the wheel circumferential direction X of the well portion 11c, and thereby free from blowing of air (fluid containing water and the like) discharged from the air valve 30.

In more detail, as shown in FIG. 4, the air valve 30 is arranged at a position shifted from a position where the communication hole 13b of the additional air chamber member 13 is arranged in the wheel circumferential direction X. In this example, the discharge port 31 of the air valve 30 is arranged directed to a space between the additional air chamber members 13, 13. The space is shifted from the communication hole 13b by angle θ in the wheel circumferential direction X.

In the embodiment, as described above, since the additional air chamber member 13 is arranged at a regular interval (at about each 90 degrees) in the wheel circumferential direction X, the angle θ is about 45 degrees.

Figure 7:
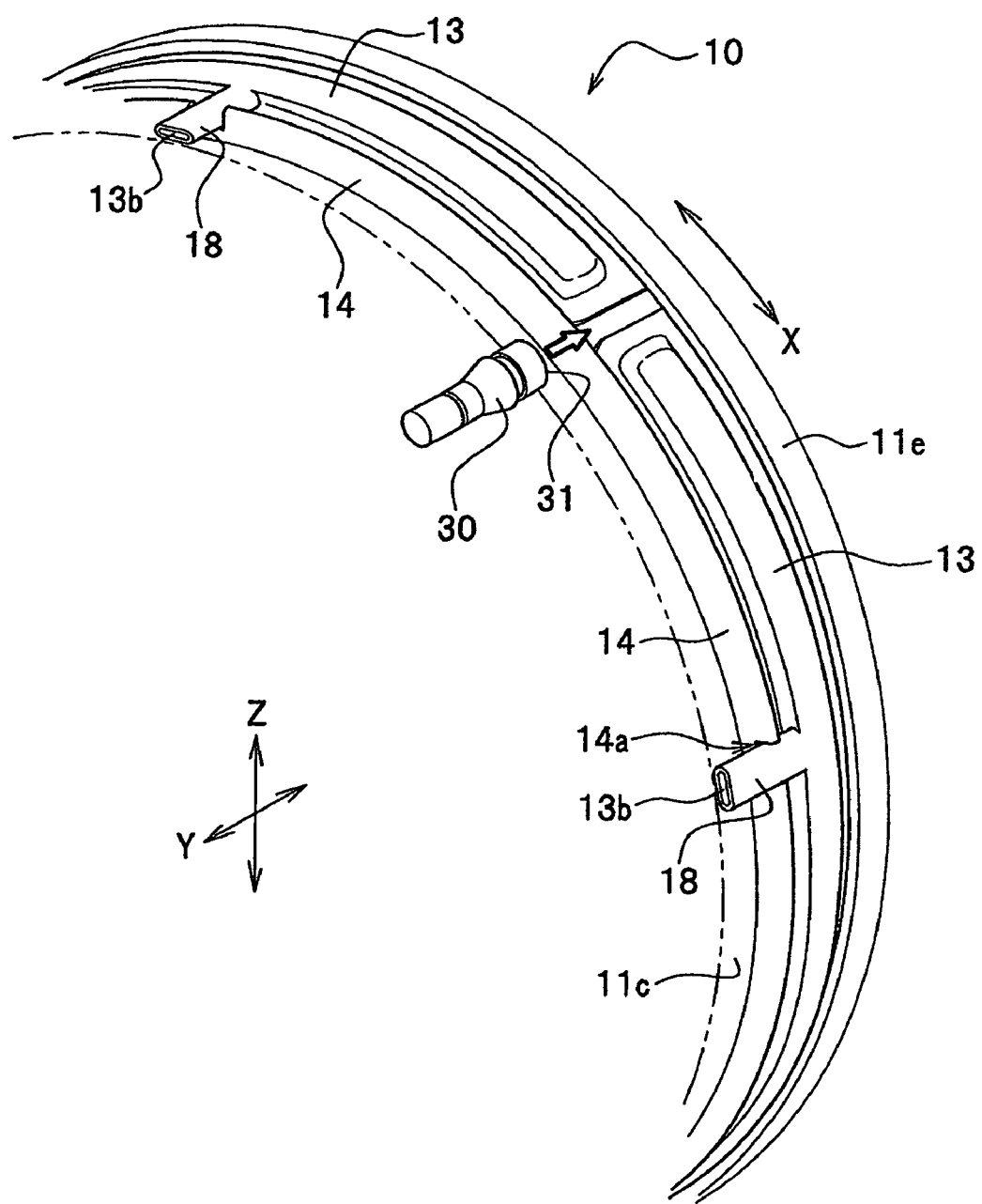
FIG. 7 is a view for explaining operations and effects of a vehicle wheel according to the embodiment of the present invention.

Therefore, as shown in FIG. 7, air discharged from the discharge port 31 of the air valve 30 flows toward a space between the additional air chamber members 13, 13. As a result, even if water accumulated in, for example, a compressor or tire repairing agent is discharged from the discharge port 31 of the air valve 30, the water or the agent is prevented from directly entering the communication hole 13b. Therefore, a volume of the additional air chamber SC (see FIG. 3) is not changed by, for example, water.

(Edge Portion)

As shown in FIG. 5, the foregoing edge portion 13e is formed by a plat-like body which extends from the main body 13a to the periphery thereof. In more detail, as shown in FIG. 3, the edge portions 13e, 13e are formed by bonding the bottom plate 25a and the upper plate 25b. In addition, the edge portions 13e, 13e extend from the main body 13a in the wheel width direction Y and the front end portions of the edge portions 13e, 13e are fit in the respective groove portions 17, 17 (see FIG. 3) of the first vertical wall surface 15 and the second vertical wall surface 16 and locked to the respective locking surfaces 17a, 17a thereof.

As described above, the edge portions 13e, 13e extending to the first vertical wall surface 15 and the second vertical wall surface 16 form a curved surface expanding toward the outer circumferential surface 11d of the well portion 11c together with the curved bottom plate 25a (see FIG. 3).

A thickness of the edge portions 13e, 13e according to the embodiment are set to a thickness identical to those of the bottom plate 25a and the upper plate 25b. It is noted that the edge portions 13e, 13e according to the embodiment have spring elasticity through selection of a thickness and resin material of the edge portions 13e, 13e as appropriate.

The foregoing additional air chamber member 13 is made of resin. The resin is preferably a light-weight and high-rigidity material which is capable of blow molding in consideration of, for example, improvement of weight saving and mass productivity, manufacturing cost reduction and securing airtightness of the additional air chamber SC. Especially, polypropylene is the most preferable, which is resistant to repeated bending fatigue.

In the vehicle wheel 10 according to the embodiment described above, since the communication hole 13b is disposed and opened at a position shifted from the discharge port 31 of the air valve 30 in the wheel circumferential direction X of the well portion 11c and thereby free from blowing of air (fluid containing water and the like) discharged from the air valve 30, even if water or tire repairing agent is discharged from the air valve 30 when a tire pressure is adjusted, the water and the tire repairing agent do not enter the additional air chamber SC of the additional air chamber member 13 through the communication hole 13b.

Therefore, a change of volume of the additional air chamber SC due to entering of, for example, water or tire repairing agent is not caused, and thereby, a reduction of the air column resonance sound by the additional air chamber member 13 can be effectively maintained.

In addition, a static wheel balance can be prevented from deteriorating due to entering and accumulating of water and the like in the additional air chamber.

In addition, in the vehicle wheel 10, since the communication hole 13b is formed in a thin flat shape in the wheel radial direction Z as shown in FIG. 3 and FIG. 6A, water and tire repairing agent are further prevented from entering the additional air chamber SC through the communication hole 13b.

In the vehicle wheel 10 according to the embodiment, as described above, when the additional air chamber member 13 is fixed to the well portion 11c, since a positioning of the additional air chamber member 13 against the well portion 11c is performed by fitting the rotation stopper portion 18 in the recess 14a which is formed in the vertical wall 14, a positional relation between the air valve 30 and the communication hole 13b is automatically determined. As a result, the air valve 30 and the communication hole 13b can be arranged at a desired distance in the wheel circumferential direction X.

Accordingly, a vehicle wheel 10, whose assembly work is simple in consideration of a positional relation between the communication hole 13b and the air valve 30 and which can improve the mass productivity through reducing the manufacturing workload and the manufacturing cost, can be obtained.

The embodiment of the present invention has been explained. However, the present invention is not limited to the foregoing embodiment and can be embodied in various forms.

For example, a position of the discharge port 31 of the air valve 30 may be shifted from a position of the communication hole 13b in the wheel radial direction Z, while shifting the position of the discharge port 13b from the position of the communication hole 13b in the wheel circumferential direction X.

By setting a positional relation between the discharge port 31 and the communication hole 13b as described above, even if water or tire repairing agent is discharged from the air valve 30, the water or the tire repairing agent is further surely prevented from entering the additional air chamber SC through the communication hole 13b.

What is claimed is:

1. A vehicle wheel comprising:
    an additional air chamber member forming an additional air chamber in a tire air chamber, the additional air chamber member being fixed on an outer circumferential surface of a well portion of a rim;
    a first vertical wall surface rising outward in a wheel radial direction from the outer circumferential surface of the well portion and being disposed in a vertical wall extending in a wheel circumferential direction of the outer circumferential surface; and
    a second vertical wall surface being formed in the well portion so as to face the first vertical wall surface,
    wherein the additional air chamber member is disposed between the first vertical wall surface and the second vertical wall surface and locked with the first vertical wall surface and the second vertical wall surface, and is provided with a communication hole communicating between the additional air chamber and the tire air chamber,
    wherein the communication hole extends in a wheel width direction passing through the vertical wall at a position shifted in a wheel circumferential direction from a discharge port of an air valve for supplying air in the tire air chamber.

2. The vehicle wheel according to claim 1,
    wherein the air valve is disposed on one side in a wheel width direction and the communication hole is opened toward the one side.

\* \* \* \* \*